(12) United States Patent
Fauteux et al.

(10) Patent No.: US 8,622,864 B2
(45) Date of Patent: Jan. 7, 2014

(54) DUAL DIFFERENTIAL SEMI-ACTIVE ACTUATOR FIT FOR INTERACTION TASKS AND FAST MOTION

(76) Inventors: Philippe Fauteux, Saint-Charles-de-Drummond (CA); Michel Lauria, Sherbrooke (CA); Marc-Antoine Legault, St-Jérôme (CA); François Michaud, Sherbrooke (CA); Marc-André Lavoie, Saguenay (CA)

( * ) Notice: Subject to any disclaimer, the term of this patent is extended or adjusted under 35 U.S.C. 154(b) by 469 days.

(21) Appl. No.: 12/934,415

(22) PCT Filed: Mar. 26, 2009

(86) PCT No.: PCT/CA2009/000390
§ 371 (c)(1),
(2), (4) Date: Nov. 8, 2010

(87) PCT Pub. No.: WO2009/117827
PCT Pub. Date: Oct. 1, 2009

(65) Prior Publication Data
US 2011/0045932 A1 Feb. 24, 2011

Related U.S. Application Data

(60) Provisional application No. 61/064,813, filed on Mar. 27, 2008.

(51) Int. Cl.
*F16H 47/08* (2006.01)
(52) U.S. Cl.
USPC .............................................. 475/91; 475/221
(58) Field of Classification Search
USPC ........... 475/91, 221, 220, 223, 224, 225, 271, 475/290, 294, 302, 317, 343
See application file for complete search history.

(56) References Cited

U.S. PATENT DOCUMENTS 5,041,068 A * 8/1991 Kobayashi ................... 475/221
5,062,823 A 11/1991 Ra et al.
(Continued)

FOREIGN PATENT DOCUMENTS

| DE | 9302373 | 5/1993 |
|---|---|---|
| WO | WO 2004 102298 | 11/2004 |
| WO | WO 2008 047066 | 4/2008 |

OTHER PUBLICATIONS

ADDR_1: Chapuis D. et al., Hybrid Ultrasonic Motor and Electrorheological Clutch System for Mr-Compatible Haptic Rendering, Int. conference on intelligent robots and systems. IEEE, Beijing, China, 2006, 6 pp.

(Continued)

*Primary Examiner* — David D Le
*Assistant Examiner* — David J Hlavka
(74) *Attorney, Agent, or Firm* — Benoit & Côté Inc.

(57) ABSTRACT

The present invention relates a mechanical differential actuator for interacting with a mechanical load. The mechanical differential actuator comprises first and second semi-active sub-actuators, a velocity source and first and second mechanical differentials having three interaction ports each. The first mechanical differential includes a first interaction port coupled to the velocity source, a second interaction port and a third interaction port coupled to the first semi-active sub-actuator. The second mechanical differential includes a first interaction port coupled to the velocity source, a second interaction port and a third interaction port coupled to the second semi-active sub-actuator. Finally, the second interaction ports of the first and second mechanical differentials are coupled together to form an output which is configured so as to be coupled to the load.

20 Claims, 13 Drawing Sheets

(56) References Cited

U.S. PATENT DOCUMENTS

| | | | |
|---|---|---|---|
| 6,634,976 | B1* | 10/2003 | Britt .............................. 475/91 |
| 7,004,876 | B2* | 2/2006 | Puiu .............................. 475/205 |
| 7,008,345 | B2 | 3/2006 | Phelan et al. |
| 7,056,252 | B2 | 6/2006 | Gumpoltsberger et al. |
| 7,137,922 | B1 | 11/2006 | Lu |
| 7,267,627 | B2* | 9/2007 | Mohan et al. ................. 475/221 |
| 7,267,628 | B2* | 9/2007 | Bowen ........................ 475/221 |
| 7,553,251 | B2* | 6/2009 | Nett et al. .................... 475/221 |
| 7,699,731 | B2 | 4/2010 | Bicchi et al. |
| 2005/0007059 | A1 | 1/2005 | Chew et al. |
| 2006/0052198 | A1 | 3/2006 | Namuduri et al. |
| 2007/0241696 | A1 | 10/2007 | Lauria et al. |
| 2008/0248910 | A1* | 10/2008 | Turvey ........................... 475/91 |

OTHER PUBLICATIONS

ADDR_10: Percro Laboratory Website, [retrieved on Mar. 20, 2008]. Retrieved from the Internet <URL: www.percro.org/index.php?pageId=AdvancedActuationConcepts, 2 pages>.

ADDR_11: Yamaguchi Y. et al., High-Performance 2-D Force Display System Using Mr Actuators, conference on intelligent and robot system, IEEE, Sendai, Japan, 2004, pp. 2911-2917.

ADDR_2: Chapuis D., et al., A Haptic Knob With a Hybrid Ultrasonic Motor and Powder Clutch Actuator, IEEE, Piscataway, NJ, USA, 2007, 6 pp.

ADDR_4: Lauria M. et al., 2007. High Performance Differential Elastic Actuator for Robotic Interaction Tasks, AAAI Spring symposium, 2007, 6 pp.

ADDR_7: Choi SB et al., H (Infinity) Control of a Flexible Gantry Robot Arm Using Smart Actuators, 1999, Mechatronics 9(3):271-86.

ADDR_9: Hakogi H et al, Torque Control of a Rehabilitation Teaching Robot Using Magneto-Rheological Fluid Clutches, 2006, JSME Int J Ser B 48(3):501-507.

Aghili F., Design and Control of Direct-Drive Systems with Applications to Robotics, Doctoral thesis, McGill University, Montreal, Canada, 1997, 185 pp.

Buerger S.P., Stable, High-force, Low-impedance Robotic Actuators for Human-interactive Machines. Doctoral thesis, MIT, Boston, MA, USA, 2005, 359 pp.

Chapuis D., Application of Ultrasonic Motors to MR-Compatible Haptic Interfaces, Doctoral thesis, Ecole polytechnique fédérale de Lausanne, Suisse, 2009, 165 pp.

Cheng H. et al., Advantages and Dynamics of Parallel Manipulators with Redundant Actuation. Int. conference on intelligent robots and systems, IEEE, Hawaii, USA, 2001, pp. 171-176.

Hakogi H. et al., Torque Control of a Rehabilitation Teaching Robot Using Magneto-Rheological Fluid Cluthes, JSME Int. J Ser B 48(3):501-7, 2005.

Johnson A. R. et al., Dynamic Simulation and Performance of an Electro-rheological Clutch Based Reciprocating Mechanism, Smart Mater Struct 8(5): 591-600, 1999.

Kim B.-S. et al., A Serial-Type Dual Actuator Unit with Planetary Gear Train: Basic Design and.Applications., IEEE/ASME, Transactions on Mechatronics, vol. 15, No. 1, 2010, pp. 108-116.

Kim B.-S. et al., Double Actuator Unit with Planetary Gear Train for a Safe Manipulator., Int. conference on robotics and automation, IEEE, Italy, 2007, pp. 1146-1151.

Morell J.B., Parallel Coupled Micro-macro Actuators, Doctoral thesis, MIT, Boston, MA, USA, 1996, 123 pp.

Ontanon-Ruiz et al., On the Use of Differential Drives for Overcoming Transmission Nonlinearities, Journal of Robotics Systems 15(1), 1998, pp. 641-660.

Rabindran D., A Differential-Based Parallel Force/Velocity Actuation Concept: Theory and Experiments, Dissertation, University of Texas at Austin, 2009, 302 pp.

Tonietti G., Variable Impedance Actuation, a Co-design Solution to the Safety/Performance Tradeoff in Physical Human-robot Interaction, Doctoral thesis, University of Pise, Italy, 2005, 145 pp.

Williamson M., Series Elastic Actuators, Doctoral thesis, MIT, Boston, MA, USA, 1995, 80 pp.

Zhou W. et al., Inverse Dynamics Control for Series Damper Actuator Based on MR Fluid Damper, Int. conference on advanced intelligent mechatronics, IEEE, Monterey, CA, USA, 2005, 6 pp.

Zhou W. et al., Property Analysis for Series MR-fluid Damper Actuator System, conf on robotics, automation and mechatronics, IEEE, Singapore, 2004, 6 pp.

Robinson D.W., Design and Analysis of Series Elasticity in Close-loop Actuator Force Control, Doctoral thesis, MIT, Boston, MA, USA, 1994, 123 pp.

EPO—Supplementary European Search Report—EP 09 72 4318—(EPO Form 1503 03.82)—Jul. 9, 2013—5 pages.

* cited by examiner

DUAL DIFFERENTIAL SEMI-ACTIVE ACTUATOR FIT FOR INTERACTION TASKS AND FAST MOTION

CROSS-REFERENCE TO RELATED APPLICATION

The present application claims the benefits of U.S. provisional patent application No. 61/064,813 filed Mar. 27, 2008, which is hereby incorporated by reference.

TECHNICAL FIELD

The invention relates to a dual differential semi-active actuator for interaction tasks and fast motion. More specifically, the invention relates to a dual differential semi-active actuator fit for robotic interaction tasks, force control tasks or fast motion tasks.

BACKGROUND

Most modern robotic systems are fast and repeatable position controlled machines. However, despite extensive R&D efforts, they mostly remain confined to controlled areas where they execute specific pre-programmed actions. Furthermore, they still display limited performances in tasks such as grinding, polishing, surface following and complex assembly. Moreover, even if many economically interesting man-machine interaction applications have been identified (physical therapy, training assistance, surgery assistance, manual tasks teaching, sport training, ortheses and prostheses motorization, haptics, teleoperation of interacting machines, etc.), very few have been implemented successfully.

Over the last 25 years, some researchers tried to identify and revise design paradigms with one objective in mind: to create robotic systems capable of safe and versatile interactions, which led to the development of interaction control theory. Unfortunately, classic actuators proved to be unfit for its usage and unfit for safe and versatile interaction, primarily because of high output impedance (inertia and friction) and because of the usual non-collocation of sensing and actuating transducers when force feedback is implemented.

A safe and versatile actuator, fit for a variety of interaction tasks, should possess at least four basic characteristics: 1) high force or torque density; 2) sufficient force bandwidth; 3) very low output impedance; and 4) high-fidelity force display capability. However, no classic actuator simultaneously exhibits all of these basic characteristics.

SUMMARY

According to the present invention, there is provided a mechanical differential actuator for interacting with a mechanical load, comprising:
  a first semi-active sub-actuator;
  a second semi-active sub-actuator;
  a velocity source;
  a first mechanical differential having three interaction ports, including a first interaction port coupled to the velocity source, a second interaction port and a third interaction port coupled to the first semi-active sub-actuator; and
  a second mechanical differential having three interaction ports, including a first interaction port coupled to the velocity source, a second interaction port and a third interaction port coupled to the second semi-active sub-actuator;
  wherein the second interaction port of the first mechanical differential and the second interaction port of the second mechanical differential are coupled together to form an output which is configured so as to be coupled to the load.

The foregoing and other objects, advantages and features of the present invention will become more apparent upon reading of the following non-restrictive description of illustrative embodiments thereof, given by way of example only, with reference to the accompanying drawings.

DETAILED DESCRIPTION

Figure 1:
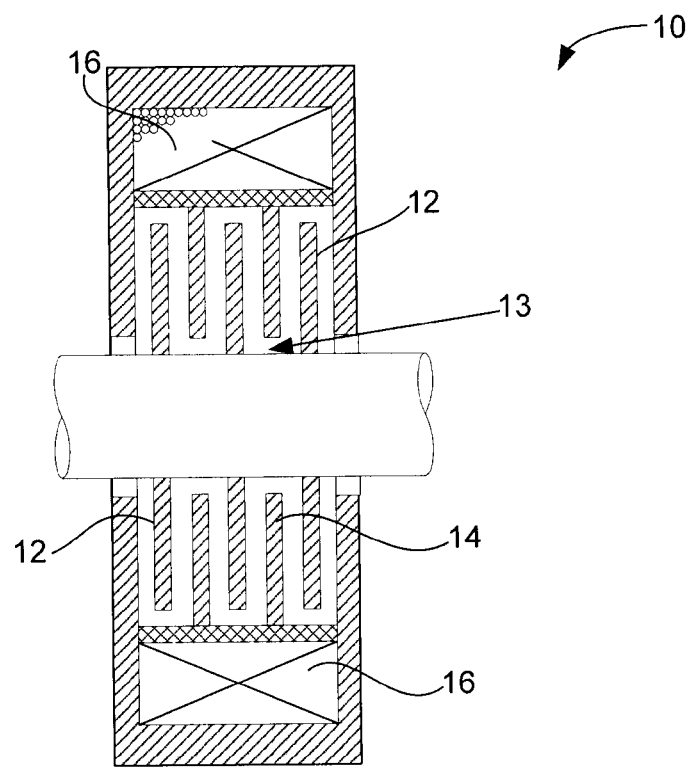
FIG. 1 is a cross-sectional view of a simplified multi-blade magnetorheological (MR) brake.

Non-restrictive illustrative embodiments of the actuator according to the present invention will now be described.

Generally speaking, the actuator according to the non-restrictive illustrative embodiments of the present invention relates to a new type of actuation mechanism using two semi-active actuators coupled to an input velocity source and to an output using two mechanical differentials. The configuration is such that the actuator's output force (or torque) is controlled in both directions by a combination of the braking forces of the semi-active actuators. The concept enables: 1) high force or torque density; 2) high bandwidth; 3) very low output impedance; and 4) high-fidelity force display capability. These characteristics enable precise force control, fast velocity control in addition to safe and versatile robotic interactions.

Introduction to Actuator Theory

An actuator is a mechanism that transforms, in a controllable manner, a particular form of energy (thermal, electrical, chemical, hydraulic, mechanical, etc.) into mechanical power and vice versa. In the present disclosure, an actuator can be, in particular but not exclusively, an aggregation of several subsystems including, for example:

control electronics;
power electronics;
energy transducer(s);
state sensor(s); and
transmission mechanism(s).

A n degree of freedom robotic system is connected to a load via n power exchange (interaction) ports. The state of each interaction port is defined via two variables: a generalized force and a generalized speed. It is impossible to control independently the two interaction state variables of a given port. Classic control focuses on one of the two variables.

For velocity (or position) control, the actuator ideally acts as a velocity source interacting with a force load. The actuator should control the speed profile transmitted to the load despite any force encountered. Real actuators designed to reach performances close to an ideal velocity source are often implemented using high mechanical impedance (inertia, friction, stiffness) components. This impedance eases the rejection of force disturbances. Flow controlled hydraulic transducers and high ratio geared electromagnetic (EM) motors are good examples. High performance velocity control is also possible with low output impedance actuators however, higher force bandwidth is necessary to counteract disturbances efficiently. Velocity control of a direct-drive EM motor is a good example.

For force control, the actuator ideally acts as a force source interacting with a velocity load. The actuator should control perfectly the force (or torque) profile transmitted to the load despite output motion. Real actuators designed to reach performances as close as possible to an ideal source of force are implemented using components with very low mechanical impedance. Output impedance can be viewed as the sensitivity of output force to output motion and is therefore detrimental. A second issue is that, if high-fidelity force control is desired, the transmission between the force generation phenomenon and the system's output should add little un-modeled force noise. Because most high force density actuators present a high impedance (inertia and friction), and because there is substantial hard-to-model force noise added by the transmissions, force control can often be a challenge.

A large class of robotic tasks is realized with low power exchange: picking and placing light objects, slowly assembling simple parts, pushing on a rigid wall. For these simple tasks, classic feedback based control of velocity or force is generally sufficient if the appropriate actuator is used. However, for complex robotic tasks with non negligible power exchanges (manipulation, locomotion, high power haptics, etc.), the lack of precise interaction models, the difficulties to precisely measure the task associated physical quantities in real-time and the non-collocation of sensing and actuating transducers have negative effects on the performance of simple force or simple velocity controllers that tend to display instabilities and which are therefore inadequate for safe and versatile interactions. To cope with these issues, researchers proposed a new approach named "interaction control" that refers to the regulation of the robot's dynamic behavior at its ports of interaction. It involves specifying a relationship between motion and force and implementing a control law that attempts to minimize deviation from this relationship. This relationship can be expressed, for example, as a desired port impedance ($Z_{ref}$), which specifies the desired output force (F) function of the measured speed ($\dot{x}$) expressed as $$Z_{ref}(s) = \frac{F(s)}{\dot{x}(s)},$$

where s is the Laplace complex argument. Velocity and force sources are then merely extremes in the possible dynamic relationships to be specified.

In robotic systems, safety issues arise when forces are not controlled or limited to acceptable levels. During an unexpected impact or during an inaccurate manipulation, even before any controller takes notice or can take effective actions, the natural impedance of the system, typically due in a large part to the actuators natural (effective) impedance, creates large loads. Once the controller takes notice, a large force bandwidth can then help in taking the appropriate counter-measures. Thus, a safe actuator should present very low natural impedance and high bandwidth.

In robotic interaction tasks, versatility can be defined as the ability to control accurately, and over a wide range, the interaction variables: force, speed or the impedance relationship. Accurate force or impedance control necessitates high-fidelity force display capabilities. The capacity to display low virtual impedances, even at high frequencies, requires low natural impedance and high bandwidth. Finally, high performance in velocity control, using an actuator with low natural impedance, is only possible if sufficient force bandwidth is available.

The quest for safety and versatility justifies the need for low natural impedance, large bandwidth and accurate force display capabilities. High force density, on the other hand, is necessary to enable the integration in useful robotic systems and can also contribute to safety if the actuator body is put into motion by the system.

Actuators Designed for Interaction Control

Implementation of machines able to control their interactions safely and in a versatile manner begins with the use of actuators specially designed for that purpose, which is a relatively new research trend. The available publications show that they are difficult to implement. Existing actuators designed for interaction tasks can be categorized by the following.

- Simple Impedance Control of an Electromechanical Actuator. The first attempt to interaction control was conducted using an EM motor with current being controlled in open loop and a standard gearbox. Open loop means inherent control stability. However, the gearbox amplifies the inertia and friction of the motor, reduces impact tolerance and introduces noise on the force. The performance was sufficient to confirm the promises of impedance control but is insufficient for most robotic applications.
- Force Feedback Actuators. They comprise a stiff force sensor placed in series with a classic high impedance actuator such as a geared EM motor. The interaction is controlled using force feedback to partially mask the natural output impedance at low frequencies. Unfortunately, the non-collocation of the sensing and actuating transducers limits stable feedback gains and stable interaction bandwidth. Furthermore, the high impedance can be a threat to safety.
- Impedance Controllable Direct Drive Actuators (DDA). Direct drive EM motors are usually low inertia devices which have a known relationship between the winding current and the output force. A fast and inherently stable force control can be achieved using a current feed-forward scheme. However, because no gearbox is used, the torque to weight ratio is small, which greatly limit the range of possible applications.
- Series Elastic Actuators (SEA). They use a compliant element placed between a high impedance actuator and a force sensor. By doing so, large amplitude bandwidth is traded for lower apparent inertia, better force resolution, improved control stability and better impact tolerance.
- Differential Elastic Actuators. Their working principle is similar to the SEA, but the use of a mechanical differential enables a simplified integration, especially for rotational actuators.
- Variable Stiffness Actuators (VSA). These actuators are able to vary their natural output stiffness by mechanical means. Most VSA make use of two non-linear mechanical springs working in an antagonistic configuration. The resulting actuators are inherently stable and impact tolerant. The main drawback are mechanical complexity and lower force-density.
- Parallel Coupled Micro-Macro Actuators (PaCMMA) and Distributed Macro-Mini (DM$_2$) Actuators. The PaCMMA and the DM$_2$ actuator use a high power SEA in parallel with a low power DDA. The SEA contributes for "low frequencies and high power" forces while the DDA actuator contributes for "high frequencies and low power" forces. The system is controlled in a closed-loop fashion using a force sensor at the output. The dynamic performances are improved compared to the SEA, but complexity and volume are increased.
- Variable Damper Actuators (VDA). These actuators use a serially or differentially coupled rheological fluid clutch placed between a high impedance actuator and the load. The variable output force is obtained by modulating the clutching torque. Advantageously, the environment (the load) is isolated from the inertia of the high impedance actuator. However, to reverse output force, the input speed must be reversed, thus limiting the bandwidth when crossing zero force. Also, the clutch friction limits the capability to display accurately small forces.

Semi-Active Sub-Actuators

Semi-active actuators are devices which can only dissipate mechanical energy. When compared to active actuators with similar forces, many are smaller, lighter and display lower output inertia. Different semi-active actuators may be used to embody the present invention such as, but not limited to: electrorheological or magnetorheological (MR) fluid brakes, dry friction brakes, magnetic particles brakes, electromagnetic hysteresis brakes, rotary dampers, etc. For simplicity, the following description is limited to MR brakes but it is to be understood that other types of semi-active actuators may also be used.

Figure 2:
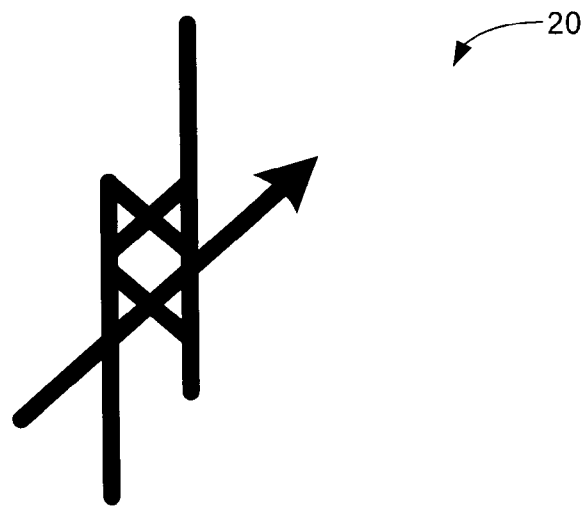
FIG. 2 is a symbol used to schematically represent a semi-active actuator such as a MR brake or an MR clutch.

The rheological behavior of MR fluids is modified by the application of a magnetic field. This change is manifested, when the fluid is sheared, by the development of a yield stress that is more or less proportional to the magnitude of the field. Referring to FIG. 1, there is shown an illustrative example of a MR rotary brake 10 that utilizes one or more interspersed rotor 12 and stator 14 blades to shear MR fluid in gaps 13 therebetween, the multiple gaps 13 allowing for increased torque. The magnetic flux can be created using, for example, an electromagnetic coil 16. Such MR brakes can present high torque to weight ratio, low inertia, high bandwidth, wide dynamic torque range and low power consumption. They can be used to create simple, quiet and rapid interfaces between electronics and mechanical systems. For the purpose of the following description, the symbol 20 illustrated at FIG. 2 will be used to schematically represent a semi-active actuator such as a MR brake or a MR clutch (in a linear configuration).

Figure 3:
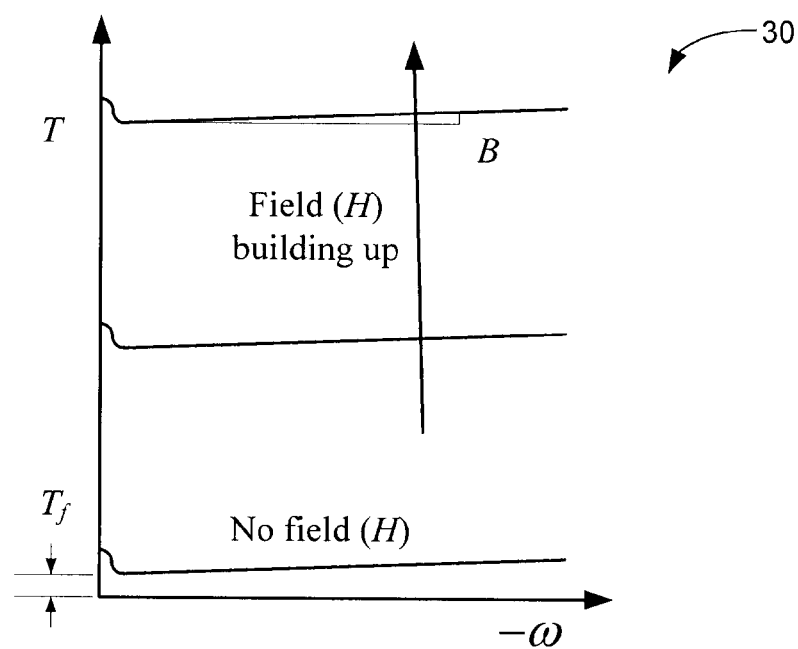
FIG. 3 is a graph of the typical torque curves of an MR brake.

Referring now to FIG. 3, there is shown a graph of the typical braking torque T versus field strength H and angular speed ω. The field dependant yield torque, which can be modulated using, for example, a tension or current feed-forward to the electromagnetic coil 16 (see FIG. 1), is $T_y(H)$. B and $T_f$ are viscous and dry friction terms. Note that a stiction phenomenon is visible at low speeds. Equation 1 is a good approximation of the output torque if there is sufficient relative motion between the rotor 12 and stator 14 blades. Equation 2 is the linear equivalent of Equation 1 (linear force F instead of torque T) where ẋ is the linear velocity and C is the linear coefficient for viscous friction.

$$T(H) = -(T_y(H) + T_f) sgn(\omega) - B\omega \qquad \text{Equation 1}$$

$$F(H) = -(F_y(H) + F_f) sgn(\dot{x}) - C\dot{x} \qquad \text{Equation 2}$$

The Opposed Semi-Active Sub-Actuators Concept

Figure 4:
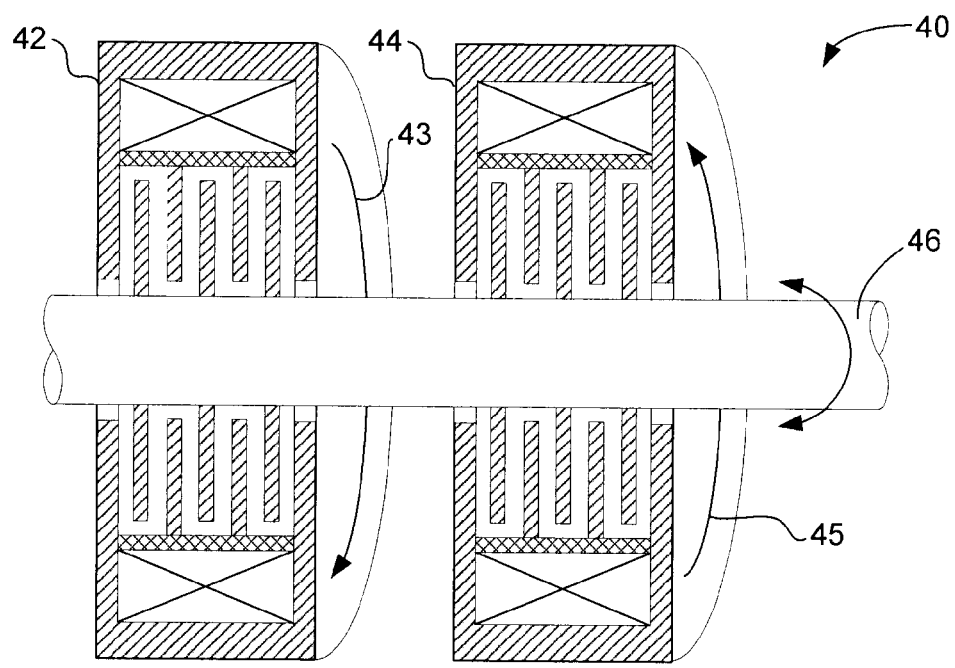
FIG. 4 is a cross-sectional view of the opposed semi-active sub-actuators concept using the simplified multi-blade MR brake of FIG. 1.

The opposed semi-active sub-actuators concept uses two similar semi-active clutches being driven at the same velocity but in opposite directions by an external velocity source [1], [2], [3], [4] and [5]. Referring to FIG. 4, the outputs of two semi-active actuators (SAA) 42, 44 are connected together to form the output member 47 of the opposed semi-active sub-actuators system 40. The input member of the first SAA 42, for example an MR clutch, rotates in a first direction 43, for example a clockwise (CW) direction, while the input member of the second SAA 44, for example an MR clutch, rotates in a second opposed direction 45, for example a counterclockwise (CCW) direction. The first SAA 42 controls the CW output torque while the second SAA 44 controls the CCW output torque as long as the output member 46 does not rotate faster than the SAAs 42, 44 input members (i.e. the frames of SAA 42 and 44).

In addition to the fact that the load is isolated from the inertia of the velocity source, many advantages come with opposing two similar semi-active actuators. For example, because of the symmetry of the design, dry friction of the clutches (e.g. the first 42 and second 44 SAAs of FIG. 4) is cancelled and is not transmitted to the output. If input speeds are similar, viscous drag is also balanced when output speed is zero. Stiction is eliminated because there is always a relative motion in the clutches. Because of these advantages, combined with the fact that clutching forces can, depending on the semi-active actuator technology, be controlled quickly and accurately by, for example, modulating the feed-forward tension or current to both semi-active actuators, this concept can be used to create a high performance (high force density, high bandwidth, very low output impedance and high-fidelity force display capability) inherently stable force source.

Mechanical Differential

Figure 5A:
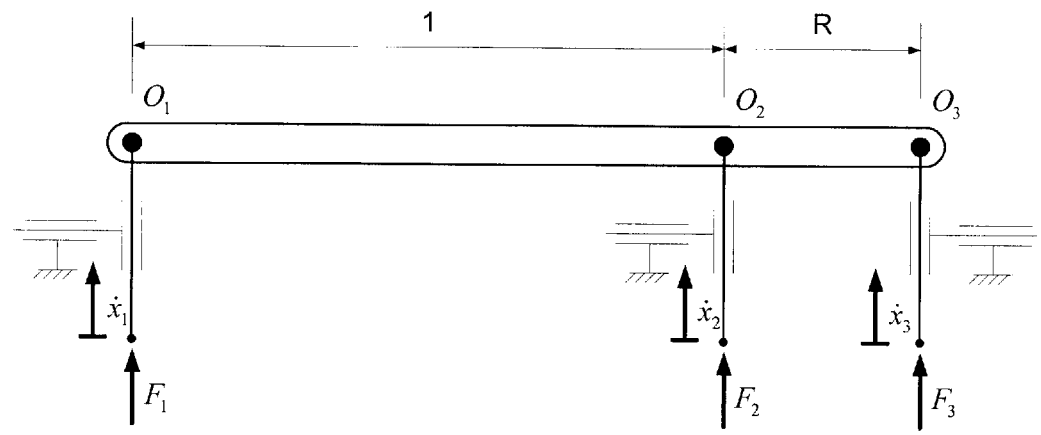
FIGS. 5a and 5b are schematic lever analogies of the mechanical differential concept without and with inertial effects, respectively.
Figure 5B:
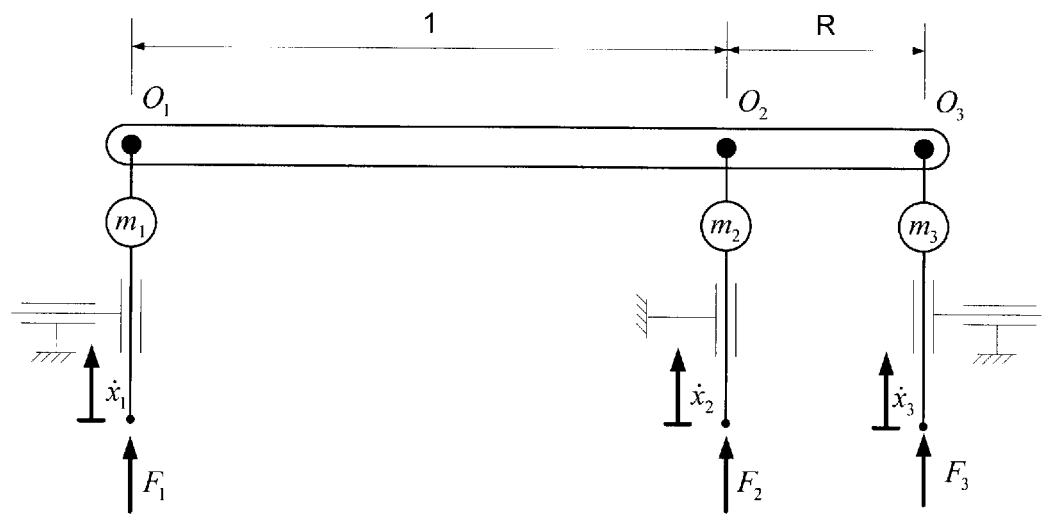

Mechanical differentials are mechanisms possessing three ports among which force is distributed following a know relationship. Any speed reducer, including, among others, a standard gearbox, a harmonic drive, a cycloidal gearbox, a bar mechanism, a lead or ball screw with corresponding nut mechanism and a cable mechanism, can be used as a mechanical differential. A lever analogy can be used to explain the working principle of differential mechanisms. FIGS. 5a and 5b illustrate such lever analogy without (FIG. 5a) and with (FIG. 5b) inertial effects considered. In the case where the inertial effects are not considered (FIG. 5a), the relationships between port $O_1$, $O_2$ and $O_3$, velocities $\dot{x}_1$, $\dot{x}_2$ and $\dot{x}_3$ and forces $F_1$, $F_2$ and $F_3$ are described by Equation 3 and Equation 4. If inertial effects are considered (FIG. 5b), as illustrated by the addition of lumped masses $m_1$, $m_2$ and $m_3$, the force relationships can rather be as expressed by Equation 5.

$$\dot{x}_3 + R\dot{x}_1 = (1+R)\dot{x}_2 \quad \text{Equation 3}$$

$$\begin{cases} F_1 = F_3 R \\ F_2 = -F_3(1+R) \end{cases} \quad \text{Equation 4}$$

$$\begin{cases} F_2 = -F_3(1+R) + \ddot{x}_2(m_2 + (1+R)^2 m_3) - \ddot{x}_1((1+R)Rm_3) \\ F_1 = F_3 R - \ddot{x}_3 Rm_3 + m_1 \ddot{x}_1 \end{cases} \quad \text{Equation 5}$$

The use of a differential mechanism provides force distribution over three ports and open new configuration possibilities for more complex actuation principles. Among the few existing actuators taking advantage of a differential coupling, are the ones proposed by Lauria et al. [6], Kim et al. [7] and Chapuis et al. [8].

Dual Differential Semi-Active Actuator Concept

In a MR clutch, there is one input rotating member and one output rotating member. The magnetic field is generated either by a rotating coil connected through a slip ring or by a stationary coil surrounded by a fixed magnetic flux guide. MR clutches are thus relatively complex. In comparison, MR brakes are smaller and simpler since the output is the only rotating member.

Because of the use of clutches, the opposed semi-active sub-actuators concept is complex to integrate. This drawback can be significantly reduced by using two differentially coupled brakes instead of the two serially coupled clutches. Accordingly, the present invention uses two semi-active actuators (brakes) coupled to an input velocity source and to the system's output using two mechanical differentials. The configuration is such that the system's output force can be controlled, in both directions, by a combination of the two braking forces.

As previously mentioned, various semi-active actuator technologies may be used to embody the present invention. However, for the sake of simplicity, MR brakes will be used to illustrate the working principle.

Figure 6:
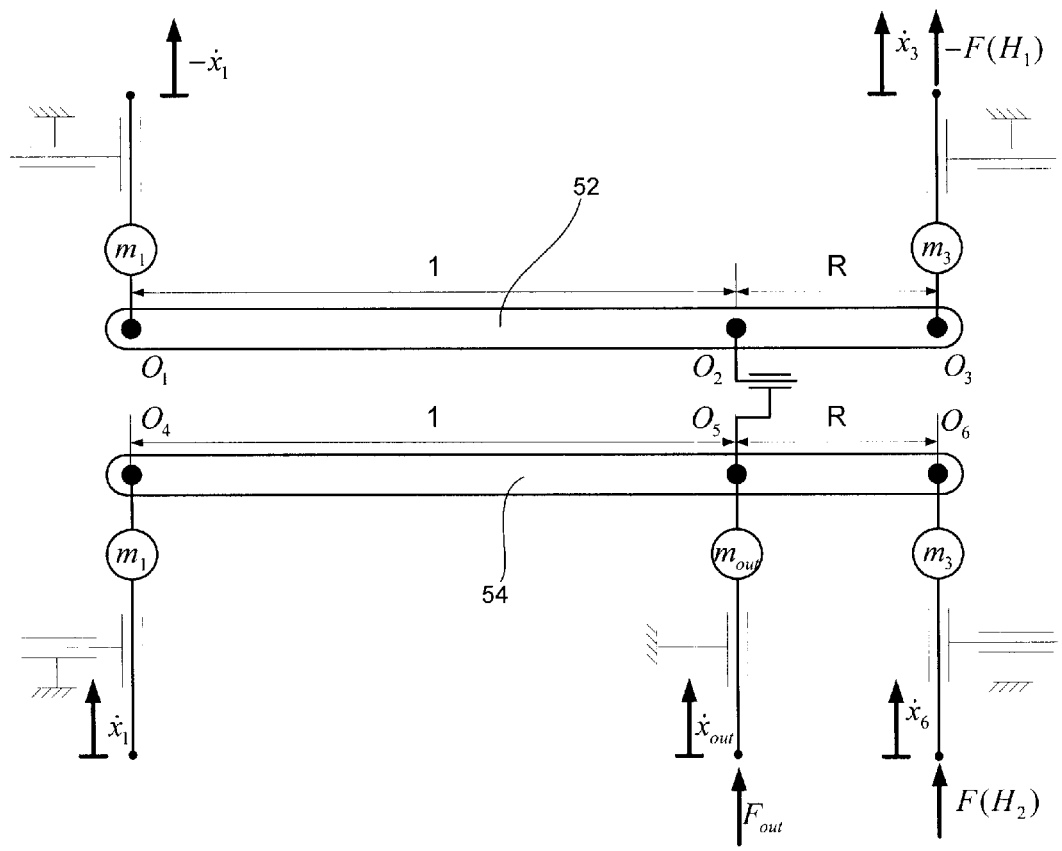
FIG. 6 is a schematic lever analogy of a possible configuration of the dual mechanical differential concept.

A possible configuration of the dual differential semi-active actuator concept is illustrated in FIG. 6 using the lever analogy to explain its working principle. A velocity source (not shown) moves the input ports $O_1$ and $O_4$ of two mechanical differentials 52, 54 in opposed directions at velocity $\dot{x}_1$. Pivots $O_2$ and $O_5$ are connected to mechanically grounded brakes (not shown) producing the braking forces $F(H_1)$ and $F(H_2)$ as expressed by Equation 2. Pivots $O_3$ and $O_6$ are linked together and form the system's output. To consider inertial effects, lumped masses are added: $m_1$ is associated with the velocity source inertia and a fraction of the differential mechanism inertia, $m_{out}$ is associated with the output link inertia and a fraction of the inertia of the mechanical differentials 52, 54 and $m_3$ is associated with the inertia of a brake and a fraction of the differential mechanism. Both input speeds, both differential mechanisms and both brakes are considered similar to facilitate the description of the working principle and the highlight of possible advantages. If the input velocity is large enough to ensure that, despite output motion, both brakes output members are moving in opposite directions, the output force $F_{out}$ can be expressed by Equation 6 and Equation 7. It is a linear combination of the two controllable braking forces and of a term that is the natural output impedance $Z_{out}(s)$ where s is the Laplace complex argument.

$$F_{out} = (F_y(H_1) - F_y(H_2))(1+R) + \dot{x}_{out} Z_{out} \quad \text{Equation 6}$$

$$Z_{out} = (2(1+R)^2(m_3 s + C) + m_{out}) \quad \text{Equation 7}$$

The previous relationships illustrate some properties of this configuration of the actuation principle. As with the opposed semi-active sub-actuators concept, the symmetry of the design is such that dry friction terms of the MR brakes are not transmitted to the output. Viscous force is balanced when output speed is zero. Stiction problems are eliminated since there is always a relative motion in the brakes. Backlash is eliminated since the reaction force in each differential mechanism is always in the same direction. Furthermore, as seen in Equation 6 and Equation 7, output force is not affected by the motion of the input velocity source which, therefore, does not need to be precisely controlled. Another property is that because of the brakes very low output inertia, the natural output impedance ($Z_{out}$) can be made very small compared to the one of classic actuators, such as a standard geared EM motor. Other advantages of an actuator based on this concept will be discussed later.

Possible Configurations

To simplify the description of the present invention, three illustrative configurations, among a plurality of possible ones, will now be discussed with reference to FIGS. 7 to 9.

Figure 7:
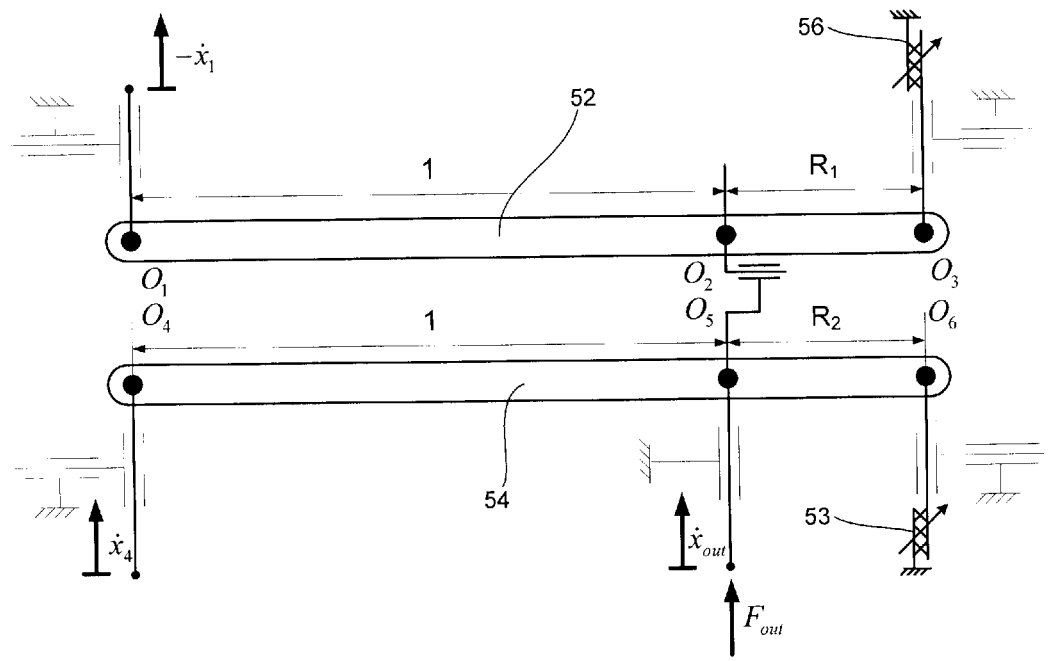
FIG. 7 is a schematic lever analogy of a first configuration of a dual mechanical differential semi-active actuator.

More specifically, the first configuration, illustrated in FIG. 7, is equivalent to the configuration used in FIG. 6 to introduce the dual mechanical differential concept with the addition of the two semi-active actuators, i.e. MR brakes 56 and 58, connected to pivots $O_3$ and $O_6$, respectively.

Figure 8:
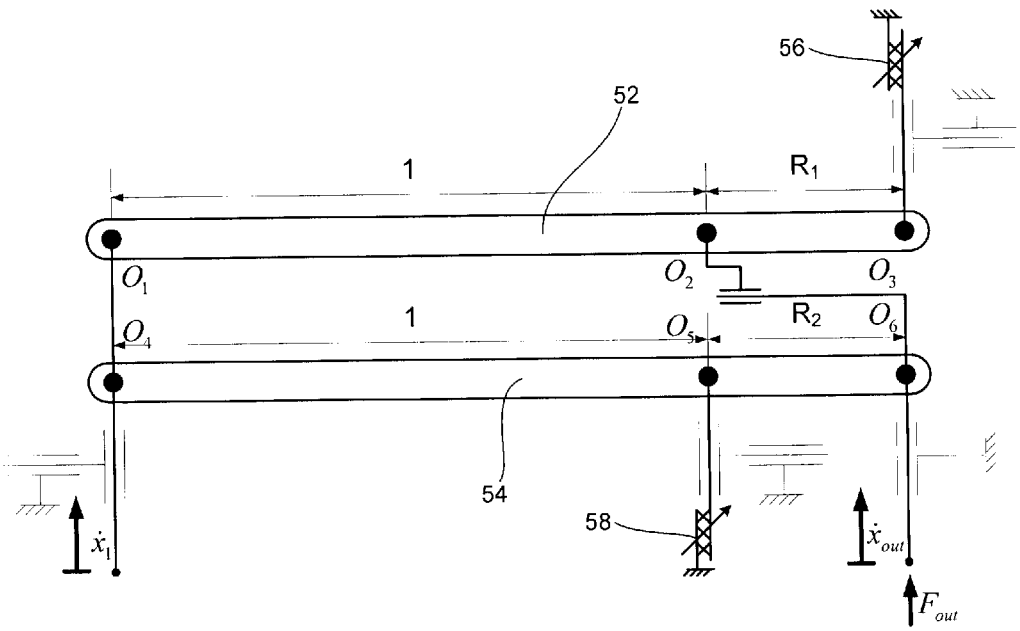
FIG. 8 is a schematic lever analogy of a second configuration of a dual mechanical differential semi-active actuator.

In the second configuration, illustrated in FIG. 8, the input velocity ports $O_1$ and $O_4$ of the two differentials 52, 54 move in the same direction while pivots $O_3$ and $O_5$ are connected to the two MR brakes 56 and 58, respectively, and pivots $O_2$ and $O_6$, are linked together to form the system's output. Because of the dual differential configuration, the output force is still controllable in both directions.

Figure 9:
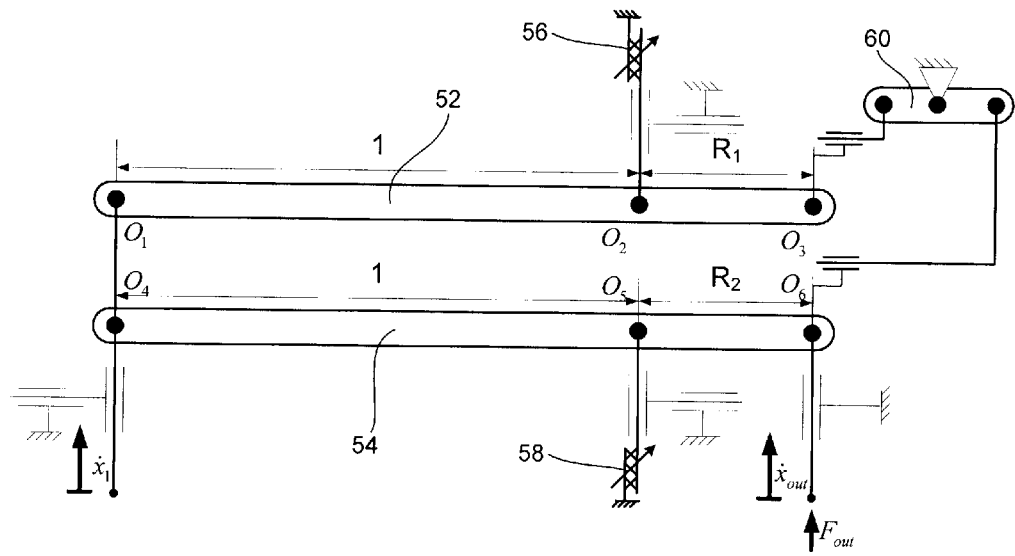
FIG. 9 is a schematic lever analogy of a third configuration of a dual mechanical differential semi-active actuator.
Figure 10:
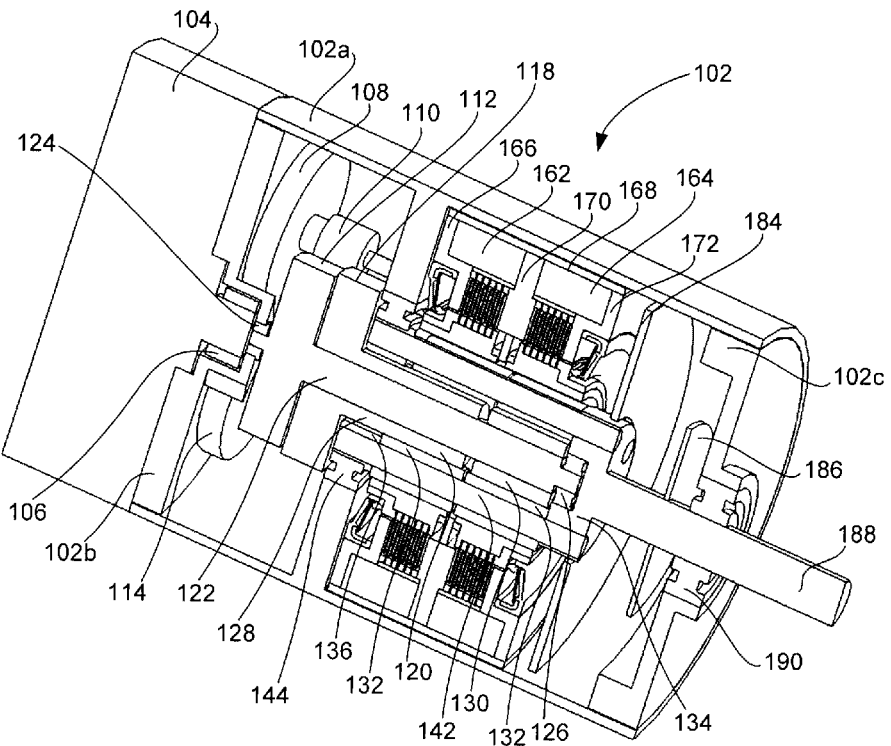
FIG. 10 is a cross-sectional perspective view of first embodiment of a dual mechanical differential semi-active actuator using two epicyclic gearing stages in a configuration equivalent to the one illustrated in FIG. 7.
Figure 11:
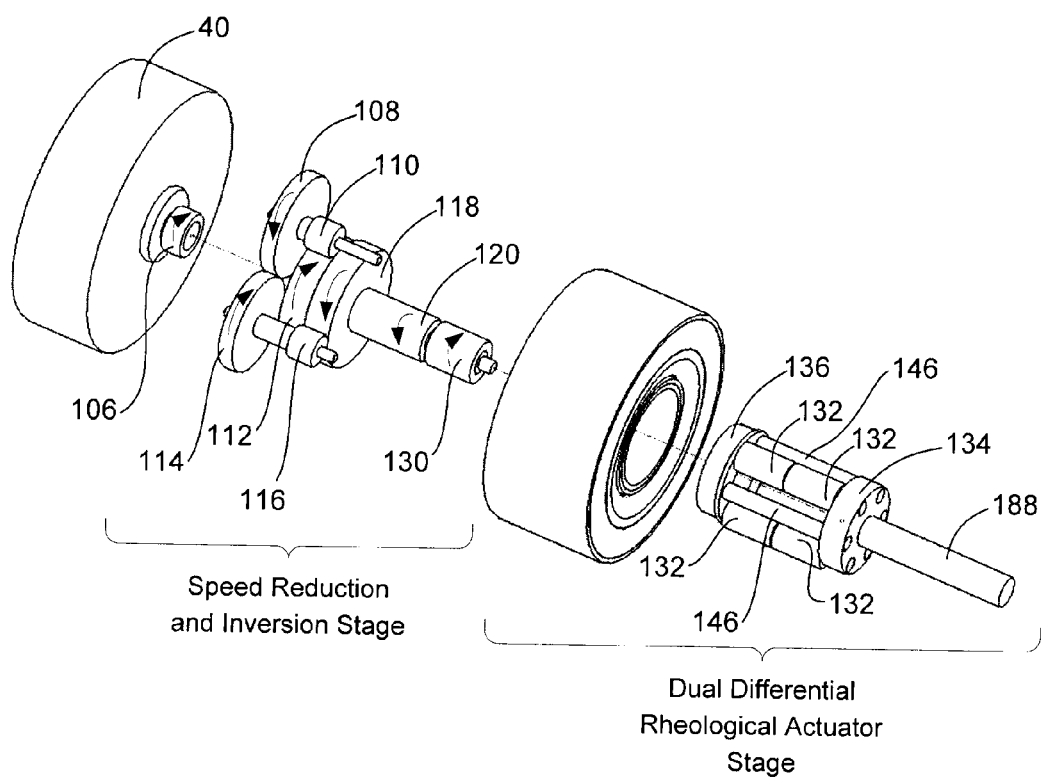
FIG. 11 is an exploded perspective view of details of subsystems of the dual mechanical differential actuator embodiment of FIG. 10.
Figure 12:
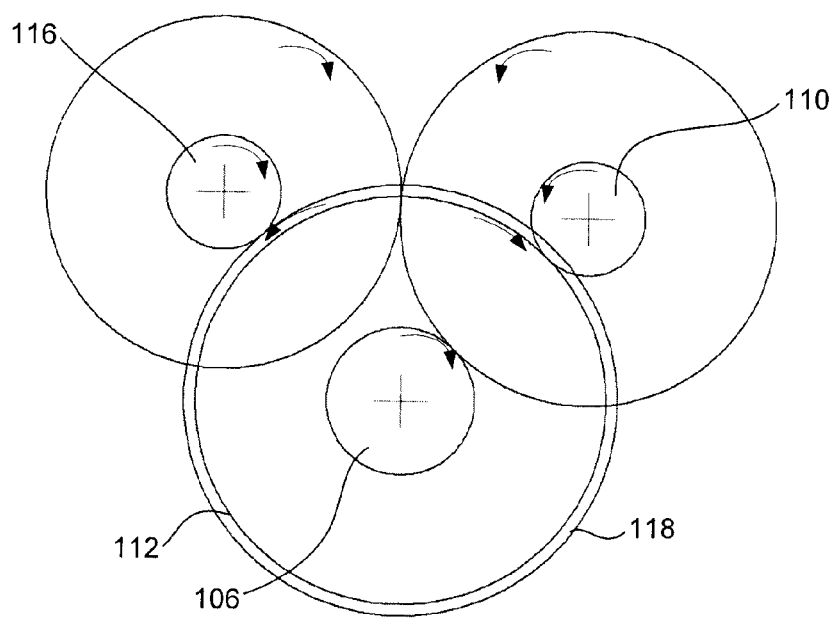
FIG. 12 is a schematic representation of the velocity directions of the reduction and inversion stage of FIG. 11.

As for the third configuration, illustrated in FIG. 9, the input velocity ports $O_1$ and $O_4$ of the two differentials 52, 54 also move in the same direction while pivots $O_2$ and $O_5$ are connected to the two MR brakes 56 and 58, respectively, and pivots $O_3$ and $O_6$, are connected to an external mechanism 60 (represented by a third lever) to form the system's output. The external mechanism 60 is necessary so that braking forces have opposed effects on the output force.

These illustrative configurations can be implemented using, for example, a cable mechanism, a lead or ball screw with corresponding nut mechanism, a bar mechanism, a cycloidal gearbox, an epicyclic gearbox, a standard gearbox, a harmonic drive, etc.

The output force may be controlled by, for example, modulating the feed-forward tension or current to both semi-active actuators. Alternatively, the output force may also be controlled using a torque feedback control scheme with a force or torque sensor between the output and the load.

It should be noted that, as long as the output force is controllable in both directions using the two braking forces provided by the MR brakes 56 and 58, lever 52, 54 lengths may be varied independently and port $O_1$ to $O_6$ functions (link to input velocity source, link to brake or link to system's output) may be permuted without departing from the spirit and nature of the present invention.

ILLUSTRATIVE EMBODIMENTS OF THE DUAL DIFFERENTIAL SEMI-ACTIVE ACTUATOR

First Illustrative Embodiment

In a first illustrative embodiment, with reference to FIGS. 10 to 15, two epicyclic gearing stages are used in a dual differential configuration equivalent to the one illustrated in FIG. 7. Generally speaking, this first illustrative embodiment includes the following, which will be detailed further on:
- an input velocity source including an electromagnetic (EM) motor and a velocity reduction and inversion stage, with two members moving with velocities opposed in direction forming the output of this velocity source;
- a dual differential mechanism based on two epicyclic gearing stages, coupled to the input velocity source, to two MR brakes and to the system's output; and
- control and drive electronics that is optionally included in the actuator main volume.

More specifically, referring to FIGS. 10 to 15, to form the velocity source, a housing 102 (composed of a housing body 102a and two housing ends 102b and 102c) is mechanically fixed to a reference frame (not shown). The rotor of the EM motor 104 is attached to pinion 106 which meshes with a gear 108. Gear 108 is itself attached to pinion 110 which meshes with gear 112 forming the first velocity source output. Gear 108 also meshes with gear 114 which is itself attached to pinion 116 which meshes with gear 118 forming the second velocity output. The two output velocities move in opposed directions as schematically illustrated by the arrows in FIGS. 11 and 12.

To link the velocity source outputs, i.e. gears 112 and 118, to the mechanical differentials input ports, gear 112 is attached to sun gear 130 through shaft 122 which motion is guided by bearings 124 and 126. Gear 118 is attached to sun gear 120 through hollow shaft 128 which rotates freely onto, and therefore which motion is guided by, shaft 122.

Two epicyclic gearing stages are used to form the dual differential mechanism. An epicyclic gearing stage, in a differential configuration, is equivalent to one of levers 52 or 54 of FIG. 7 with R being the ratio of the number of teeth of the sun gear to the annulus gear. The differential function is realized by the interaction of sun gears 120 and 130 (ports $O_1$ and $O_4$) with planet gears 132 mounted on front 134 and back 136 planet carriers (ports $O_2$ and $O_5$), and with annulus gears 138 and 140 (ports $O_3$ and $O_6$). The planets of the two epicyclic gearing stages rotate freely on planet carrier shafts 142 which are supported by the front 134 and back 136 planet carriers which motion are guided by bearings 144 and 190. In this first illustrative embodiment, rods 146 are used to increase the rigidity of the front 134 and back 136 planet carriers.

Figure 13:
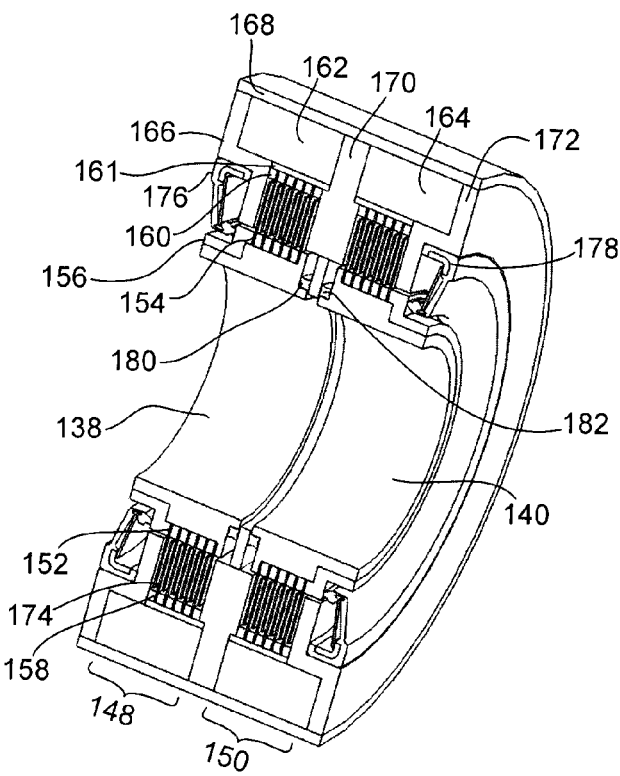
FIG. 13 is a cross-sectional perspective view of the MR brakes of the dual mechanical differential semi-active actuator of FIG. 10.
Figure 14:
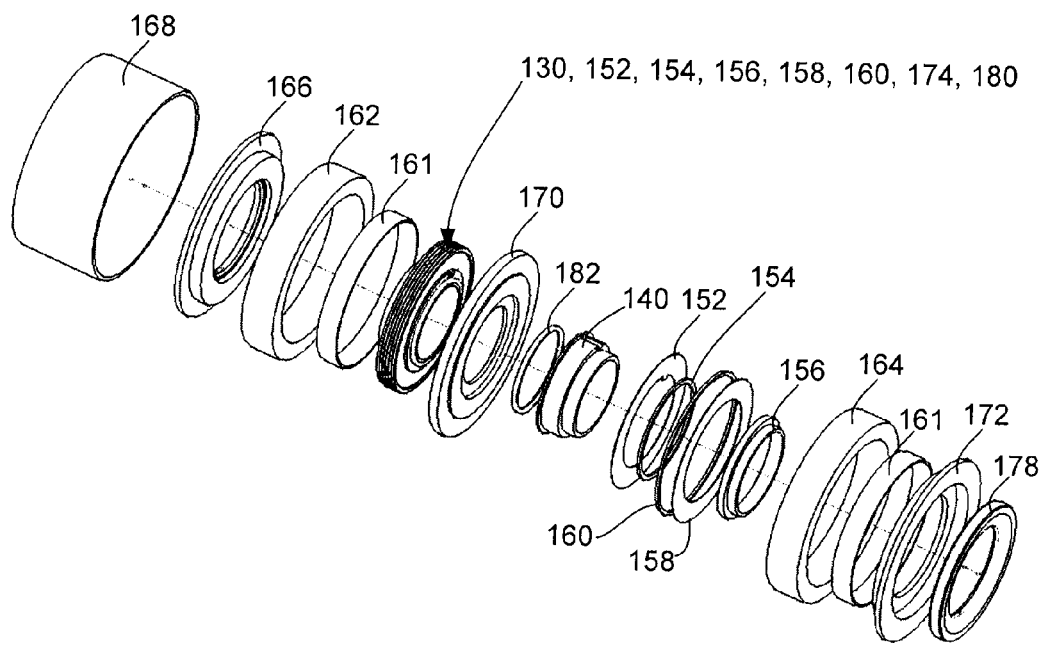
FIG. 14 is an exploded perspective view of the MR brakes of the dual mechanical differential semi-active actuator of FIG. 10.

Referring more specifically to FIGS. 13 and 14, the rotors of the MR brakes 148 and 150 are formed by a number of rotor blades 152 and rotor spacers 154 fastened, with the help of nut 156, to the annulus gears 138 and 140. The stators of the MR brakes 148 and 150, which are fastened to the housing body 102a are, on the other hand, formed by a number of stator blades 158 and stator spacers 160, of ring 161, of electromagnetic coils 162 and 164, and of magnetic flux guide parts 166, 168, 170 and 172. The gaps 174 between the rotor 152 and stator 158 blades are filled with MR fluid. Sealing elements 176, 178, 180 and 182 are used to confine the MR fluid. When an electric current flows through one of the coils 162 and 164, a magnetic field is generated and guided through the MR fluid of the corresponding brake, i.e. 148 and 150, respectively. Consequently, the brake 148 or 150 opposes to the rotation of the rotor (annulus gear 138 or 140, respectively) relative to the stator.

Figure 15:
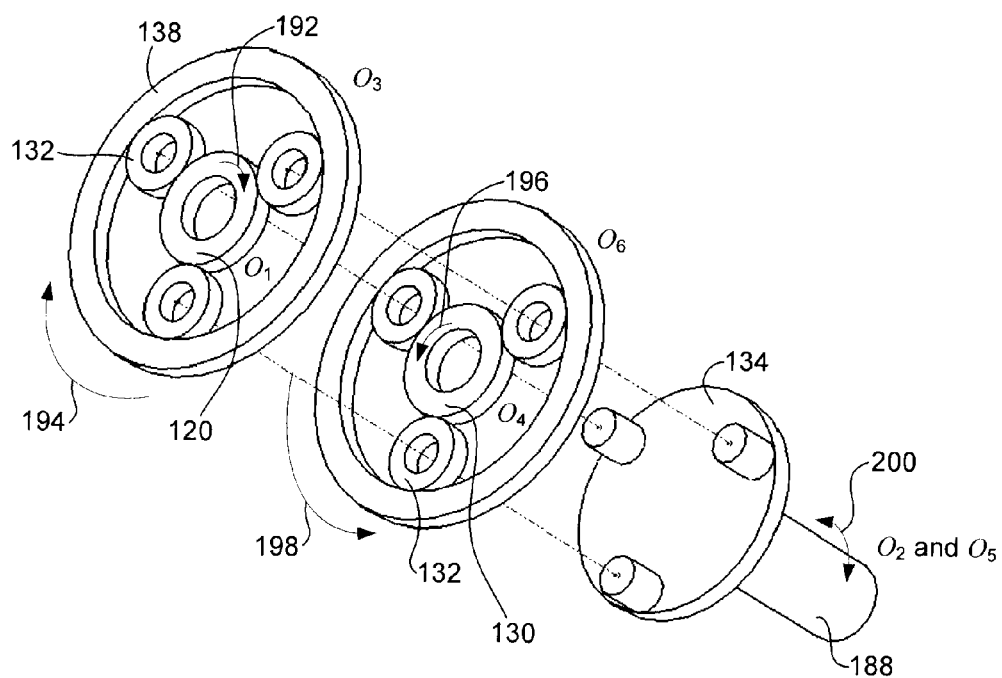
FIG. 15 is a simplified perspective view of the dual-differential mechanism of the dual mechanical differential semi-active actuator of FIG. 10.

Referring now to FIG. 15, there is shown the direction of the input velocities 192 and 196 of sun gears 120 and 130, respectively, as well as the braking torques 194 and 198 of annulus gears 138 and 140, respectively, resulting in output torque 200 at the output shaft 188.

Referring back to FIG. 10, controller and drive electronics 184 controls the rotation of the EM motor 104 and the two braking forces by modulating the electrical energy supplied to the electromagnetic coils 162 and 164 of the MR brakes 148 and 150. Control and drive electronics 184 are optionally included in the actuator main volume. Depending on the adopted control scheme, an optional encoder 186 can be used to sense the motion of the output shaft 188 guided by bearings 144 and 190.

Second Illustrative Embodiment

Figure 16:
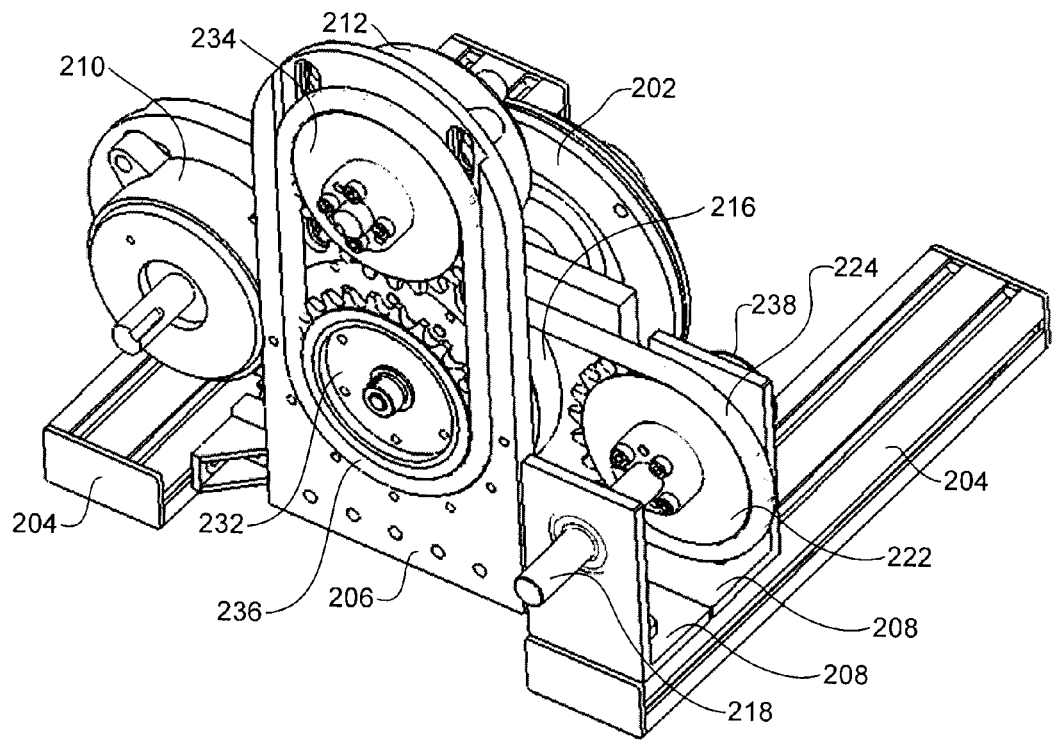
FIG. 16 is a perspective view of a second embodiment of a dual mechanical differential semi-active actuator using two harmonic drive gearing stages in a configuration equivalent to the one illustrated in FIG. 8.
Figure 17:
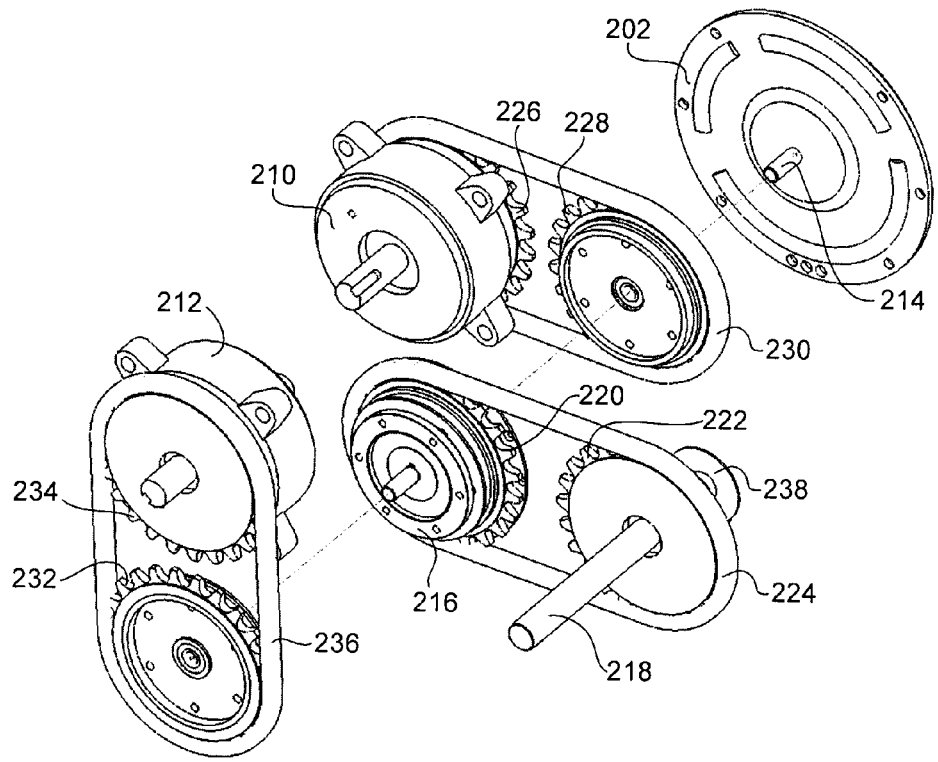
FIG. 17 is an exploded perspective view of the dual mechanical differential semi-active actuator of FIG. 16.
Figure 18:
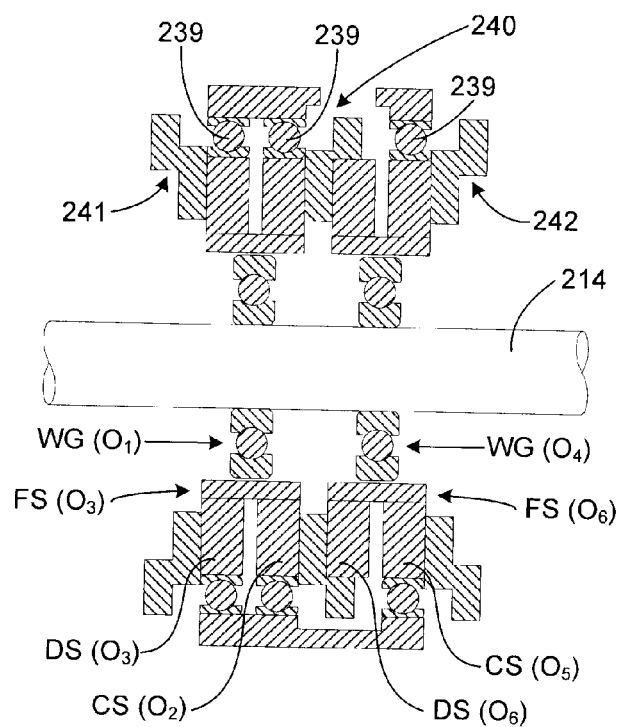
FIG. 18 is a simplified cross-sectional view of the dual differential mechanism of the dual mechanical differential semi-active actuator of FIG. 16.

In a second illustrative embodiment, with reference to FIGS. 16 to 18, two harmonic drive gearing stages are used in a dual differential configuration equivalent to the one illustrated in FIG. 8. Generally speaking, this second illustrative embodiment includes the following, which will be detailed further on:
- an input velocity source formed by an electromagnetic (EM) motor;
- a dual differential mechanism, based on two harmonic drive (HD) gearing stages, coupled to the input velocity source, to two MR brakes and to the system's output; and
- control and drive electronics.

More specifically, referring to FIGS. 16 to 18, to form the velocity source, the body of the EM motor 202, the support base 204, the support plates 206, support brackets 208 and the bodies of the MR brakes 210 and 212 are mechanically grounded. The output shaft 214 of the EM motor 202 forms the velocity source which is connected to the input ports of the dual differential mechanism 216 (see FIG. 17).

Two HD gearing stages are used to form the dual mechanical differential mechanism 216 of which FIG. 18 shows a simplified cut-off view. In general, a HD gearbox is composed of three components: 1) a wave generator (WG); 2) a flexible spline (FS); and 3) a circular spline (CS). The two HD gearing sets used have a fourth component called the dynamic spline (DS) which rotates with the FS [9]. An HD gearing stage can be viewed as equivalent to one of levers 52 or 54 of FIG. 8 with WG as $O_1/O_4$, CS as $O_2/O_5$, FS/DS as $O_3/O_6$ and R being equivalent to 2 divided by the number of teeth of the FS/DS. Both WG (ports $O_1$ and $O_4$) are fastened to the output shaft 214 of the EM motor 202. The CS ($O_2$) of the first HD gearing stage is fastened to the FS ($O_6$) of the second. This assembly is then linked to the system's output shaft 218 through pulleys 220 and 222, and belt 224. The DS ($O_3$) of the first gearing stage is linked to MR brake 210 through pulleys 226 and 228, and belt 230. The CS ($O_5$) of the second gearing stage is finally linked to MR brake 212 through pulleys 232 and 234, and belt 236. Four-point contact bearings 239 are used to guide the motion of the pulleys and attached gearing elements. The dual mechanical differential mechanism 216 is linked at link 240 to the output shaft 218 through belt 224, at link 241 to MR brake 210 through belt 230 and at link 242 to MR brake 212 through belt 236.

Commercially available MR brakes may be used for MR brakes 210 and 212, such as, for example, those available from LORD Corporation [10].

A controller and drive electronics (not shown) controls the rotation of the EM motor 202 and the two braking forces by modulating the electrical energy supplied to MR brakes 210 and 212. Depending on the adopted control scheme, the optional encoder 238 can be used to sense the motion of the output shaft 218.

Figure 19:
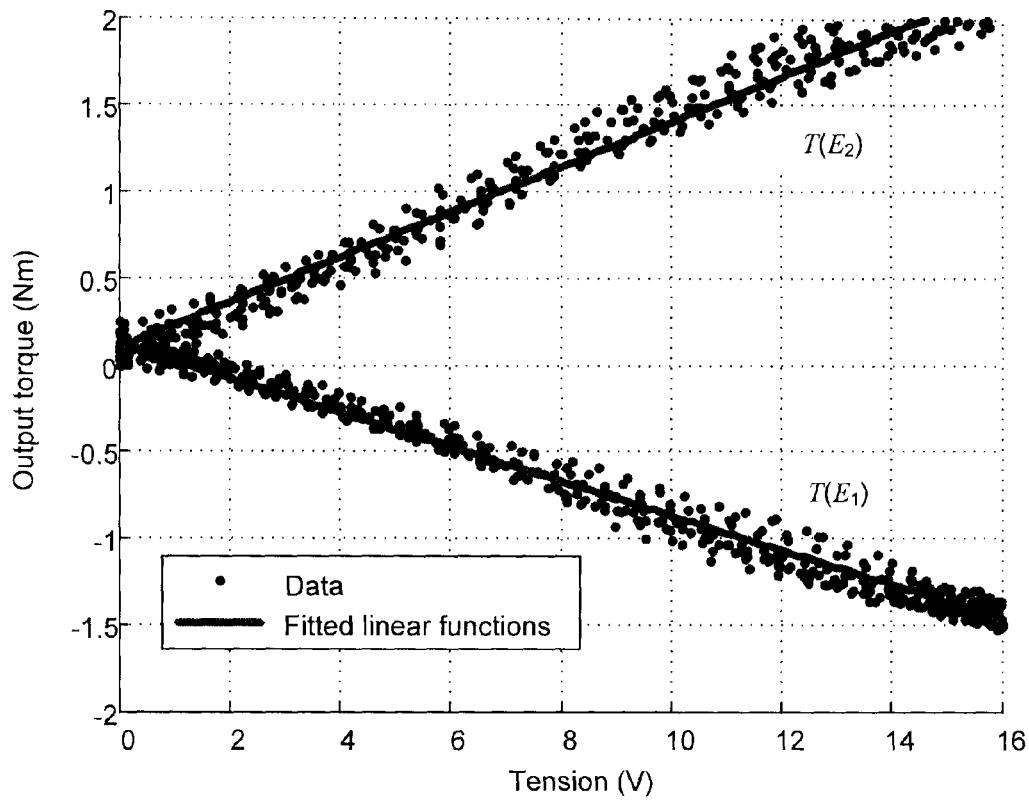
FIG. 19 is a graph of the torque output as a function of the input tension in the two MR brakes of the dual mechanical differential semi-active actuator of FIG. 16.
Figure 20:
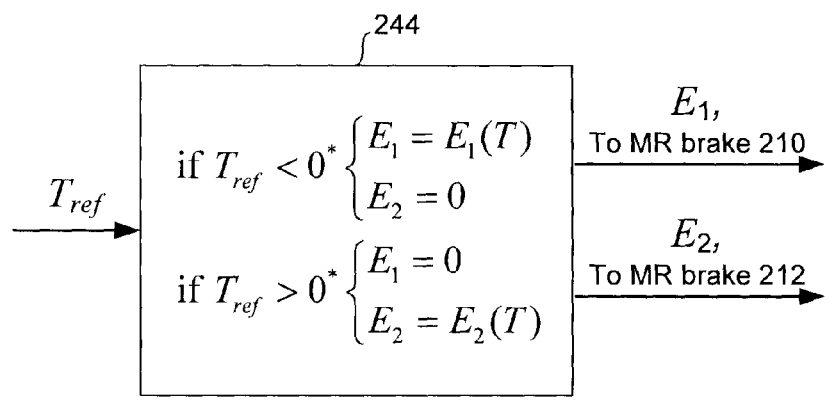
FIG. 20 is a schematic view of an example of a tension feed-forward torque controller for use with the dual mechanical differential semi-active actuator of FIG. 16.
Figure 21:
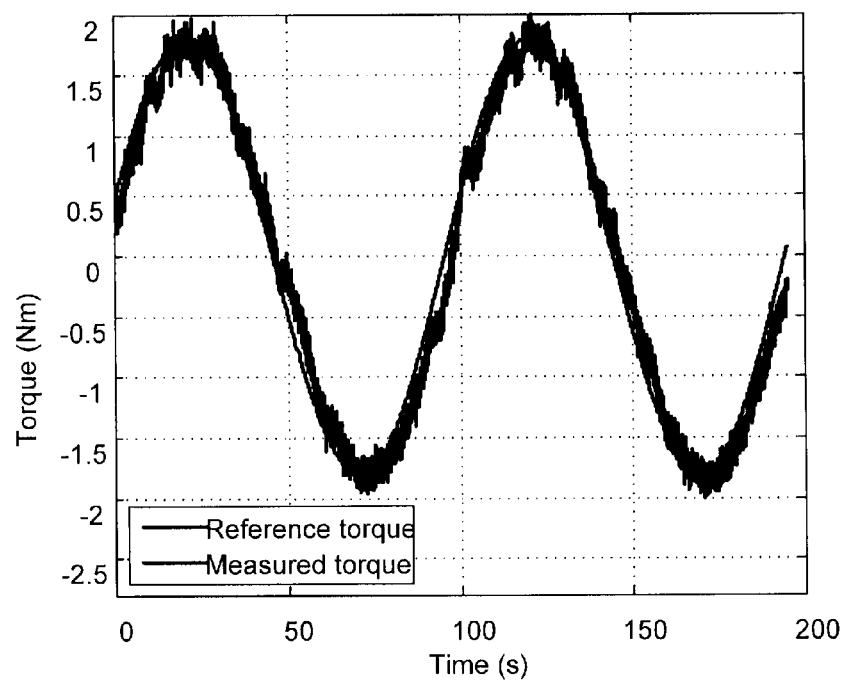
FIG. 21 is a graph of the torque response of the controller of FIG. 20 to a slow sinusoidal command.

The controller may use, for example, an electrical tension feed-forward torque control scheme. In such a scheme, the relationships between the output torque (T) and the electrical tension applied to MR brakes 210 and 212 ($E_1$ and $E_2$) are first identified. For that purpose, the EM motor 202 is set to rotate at a constant velocity while a slowly varying sinusoidal tension is sent to the MR brakes 210 and 212. Output torque is measured with output motion blocked. Data and fitted linear curves are presented in FIG. 19. Partly because of the asymmetry of the chosen configuration, the curves do not cross at exactly 0 Nm, but rather at a small torque value (0*). In opposition to the configuration of FIG. 6, a small fraction of the MR brakes 210 and 212 friction is transmitted at the output. FIG. 20 shows an illustrative example of a tension feed-forward torque controller 244 using the data from FIG. 19 while FIG. 21 shows the torque response to a slow sinusoidal torque command with output motion blocked using the controller of FIG. 20.

Third Illustrative Embodiment

Figure 22:
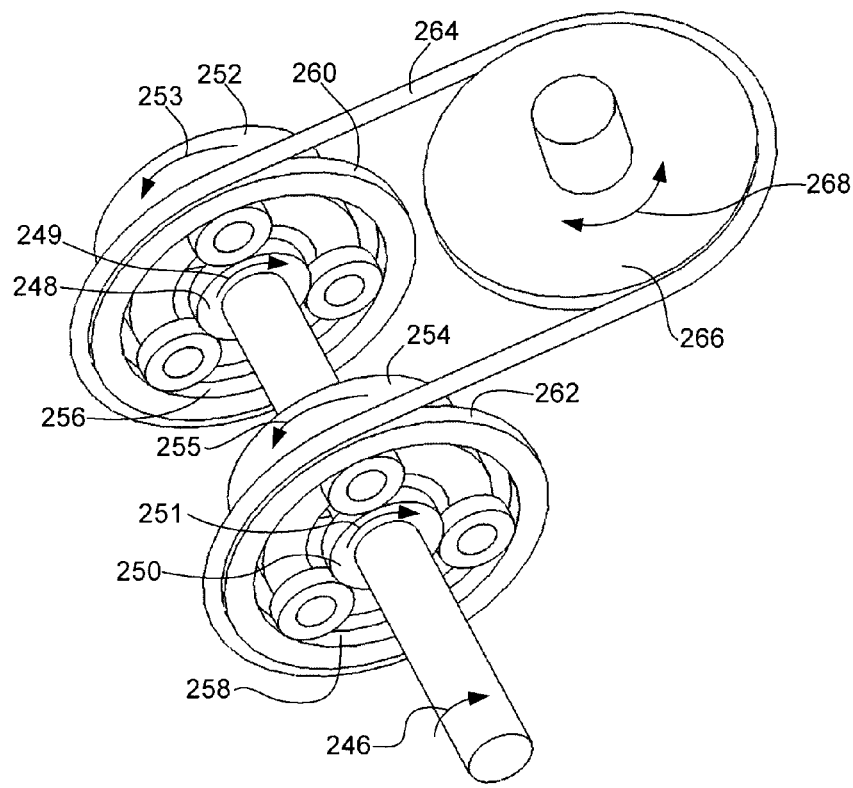
FIG. 22 is a perspective view of a third dual differential mechanism embodiment using two epicyclical gearing stages in a configuration equivalent to the one illustrated in FIG. 9.

In a third illustrative embodiment, with reference to FIG. 22, two epicyclic gearing stages are used in a dual differential configuration equivalent to the one illustrated in FIG. 9.

A velocity source 246 is connected to sun gears 248 and 250 (ports $O_1$ and $O_4$) which rotate with velocities 249 and 251. Planet carriers 252 and 254 (ports $O_2$ and $O_5$) are connected to the MR brakes (not shown) which produce braking torques 253 and 255. Annulus gears 256 and 258 (ports $O_3$ and $O_6$) are fastened to pulleys 260 and 262 which drive cable or belt 264. The output of the system is pulley 266. The pulleys 260, 262, 266 and the cable or belt 264 compose the external mechanism 60 of FIG. 9, which is used so that the two braking torques have opposed effects on the output torque 268.

Fourth Illustrative Embodiment

Figure 23A:
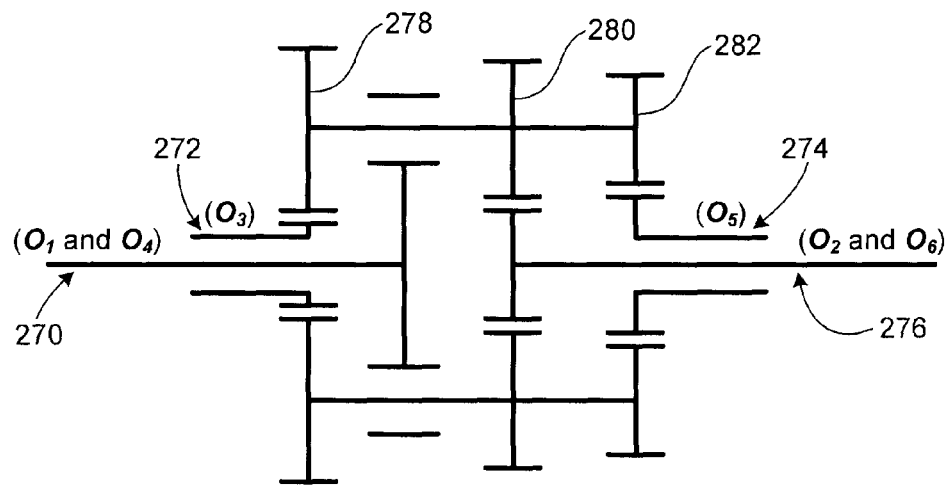
FIGS. 23a and 23b are schematic views of two variants of a fourth embodiment of a dual mechanical differential mechanism using two epicyclic gearing trains in a configuration equivalent to the one illustrated in FIG. 8.
Figure 23B:
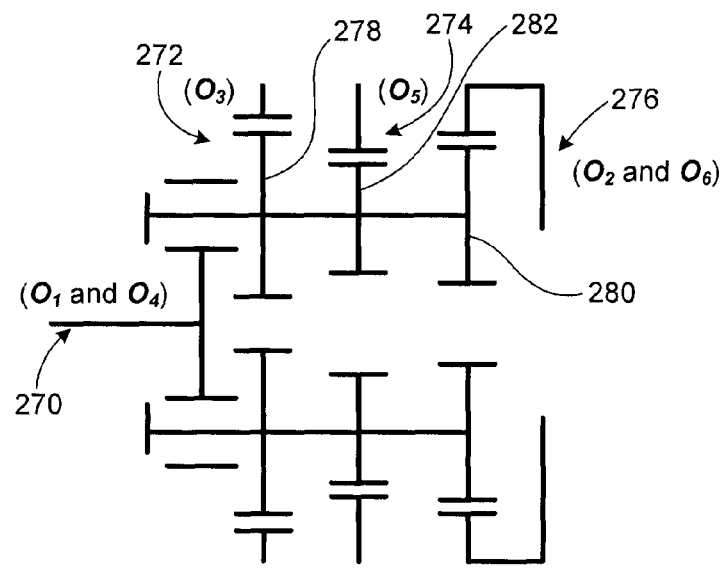

In a fourth illustrative embodiment, with reference to FIG. 23a or 23b, an epicyclic gearing train is used in a dual differential configuration equivalent to the one illustrated in FIG. 8. FIGS. 23a and 23b shows two variants which can incorporate a high reduction ratio and the dual differential. $R_1$ and $R_2$ of FIG. 8 are functions of the relative number of teeth of gearing elements as described by Equation 8 and Equation 9 where $n_i$ is the number of teeth of gear i.

In both FIGS. 23a and 23b, the input shaft 270 (ports $O_1$ and $O_4$) is linked to the velocity source (not shown). Shaft 272 (port $O_3$) is linked to the first brake (not shown), while shaft 274 (port $O_5$) is linked to the second brake (not shown) and shaft 276 (port $O_2$ and $O_6$) acts as the system's output. Planet gear 278 has more teeth than the planet gear 280, which, itself, has more teeth than planet gear 282. If a braking torque is applied at shaft 272, a torque is transmitted to shaft 276 in a direction opposed to the one transmitted if a braking torque is applied at shaft 274.

$$R_1 = \frac{n_{276}n_{278}}{n_{280}n_{272}} - 1 \qquad \text{Equation 8}$$

$$R_2 = \frac{n_{274}n_{280}}{n_{282}n_{276}} - 1 \qquad \text{Equation 9}$$

It is to be understood that although reference has been made primarily to an EM motor as a velocity source in the above-described illustrative embodiments, such a velocity source for the purpose of the present invention refers to any source of mechanical power that can provide motion such as, for example, powered geared or direct-drive EM motors, piezoelectric motors, hydraulic motors or actuators, pneumatic motors or actuators, combustion engines, turbines, etc.

Advantages of the Dual Differential Semi-Active Actuator Concept

Common advantages of the dual differential semi-active actuator concept include the following.

- Forces can be controlled with a large bandwidth if the actuator makes use of fast semi-active actuators such as well designed MR brakes. The design is thus suitable for fast force, impedance or position control tasks. Large bandwidth is also useful for safety issues encountered in robotic interaction applications.
- Output impedance can be exceptionally low because it can be largely decoupled from the velocity source. A low output inertia actuator performs better at controlling low forces and impedances and can perform interaction tasks more safely. Furthermore, small inertia improves the ability to accelerate and decelerate quickly and enables faster motion and increased productivity.
- The actuator force or impedance can, for example, be controlled by modulating the feed-forward current or tension in the MR brakes. This control does not rely on a force feedback loop that can be destabilized by structural modes between the actuating and sensing transducers. Stability concerns have limited force and impedance control performances of many previous approaches relying on force feedback.
- The actuator can display high-fidelity force control over a wide dynamic force range. In geared motors, the force amplification transmission adds a lot of hard-to-model noise on the force output. This noise comes from kinematic imperfections, backlash, stiction and non-linear friction. The proposed concept can make use of high force-density semi-active actuators to generate large forces directly and without a need for substantial further force amplification. Consequently, the brakes can be linked to the output through minimal gearing and, therefore, if the braking forces can be controlled accurately, the actuator displays high-fidelity force control over a wide dynamic range.

Backdrivability is a measure of the minimum force required to move the output when no force is generated by the actuator. This notion has often been used to discuss the performance and safety of impedance and force controlled actuators. Because of natural low output impedance, the design is very backdrivable.

The design is robust and impact tolerant. The output force is always controlled, even during impact events where the excess energy is simply dissipated in the brakes. No fragile transmission components or sensors are subject to impulse forces commonly encountered when interacting with unknown environments.

The proposed concept could be fabricated at a reasonable cost. The decoupling effect previously mentioned makes it possible to use a low quality input velocity source such as one with large inertia, long time constants or imprecise velocity control. Furthermore, the associated gearing of the reduction and inversion stage can present a lot of non-linear friction. None of these are transmitted to the actuator output. Additionally, the gearing can be machined with large tolerances since the backlash is eliminated by the internal opposition of forces.

The elimination of backlash is beneficial to improve the precision of position control tasks. It further enables high inertia mismatch between the actuator and the load without compromising the stability of position or velocity controllers.

The actuator is suitable for redundant actuation. A robotic system has redundant actuation if the number of actuators is greater than the number of degrees of freedom. Redundant actuation is known to improve task end-effector stiffness of parallel manipulators, remove uncontrolled behavior at singularities and permit a more homogeneous force output in the task space. Classic (stiff) actuators cannot easily be used for redundant actuation because any error in the position will result in large internal forces which can destabilize or harm the system. The proposed dual differential semi-active actuator is fit for redundant actuation since it is easily backdrivable.

Another advantage of the principle is the possibility to use a mechanical bus to convey mechanical power to the different actuated joints. Generally, an actuated system with multiple degrees of freedom has a motor for each joint. Each actuator transforms the energy from an initial type (for example electrical energy) into mechanical energy. Each actuator requires a certain weight and volume to perform the transformation. A mechanical bus is a concept that allows the use of a single mechanical energy source to actuate a plurality of joints, thus lowering, for some applications, overall complexity, volume and mass.

Applications of the Dual Differential Semi-Active Actuator Concept

The above described illustrative embodiments of the present invention are particularly, but not exclusively, suitable for the design of high performance actuators adapted for integration in robotic systems and mechanisms. Many robotic tasks that require a safe, fast, precise or versatile interaction control with the environment can benefit from these designs. The application fields are numerous, including, amongst others, the following applications:

actuation of robotic arms for fast and/or precise assembly tasks;

actuation of robotic cutting machines (including laser type) for fast and/or precise cutting tasks;

actuation of rehabilitation, physiotherapy and muscular or neuromuscular training robotic systems;

actuation of safe robotic arms working in human environments;

actuation of safe and robust robotic toys;

actuation of haptic interfaces (tele-presence, tele-operation and virtual reality);

actuation of a steer-by-wire haptic driving wheel;

actuation of force or impedance controlled wheels and joints for robotic vehicles;

actuation of prostheses or ortheses;

actuation of force augmentation and tasks assistance exoskeletons;

actuation of robots for polishing or grinding;

actuation of hyper-motorized robotic mechanisms;

actuation of robotic arms that collaborate to execute a task;

actuation of robots for surgery;

actuation of limbs for humanoid robots;

any robot that manipulates variable-shape objects in an unknown environment;

any task wherein a robotic system interacts with an unknown environment;

any task requiring a controlled force or torque;

any task requiring less output inertia to enable faster motion;

any task requiring less output inertia to enable safer motion;

any task requiring less backlash to improve positioning precision and/or control stability actuation of multiple airplane flaps from a single mechanical power source;

actuation of multiple helicopter blades from a single mechanical power source; and any actuation where the mechanical bus concept is useful.

It should be understood that the invention is not limited in its application to the details of construction and parts illustrated in the accompanying drawings and described hereinabove. The invention is capable of other embodiments and of being practiced in various ways. It should also be understood that the phraseology or terminology used herein is for the purpose of description and not limitation.

Hence, although the present invention has been described hereinabove by way of non restrictive illustrative embodiments thereof, these embodiments can be modified, within the scope of the appended claims, without departing from the spirit and nature of the subject invention.

REFERENCES

[1] M. Sakguchi, J. Furusho, "Development of ER actuators and their applications to force display systems", *IEEE Virtual Reality Annual International Symposium*, 1998, p 66-70.

[2] S. B. Choi, S. S. Han, H. K. Kim, C. C. Cheong, "H$_{infinity}$ control of a flexible gantry robot arm using smart actuators", *Mechatronics* 9(3):271-86, 1999.

[3] H. Hakogi, M. Ohaba, N. Kuramochi, H. Yano, "Torque control of a rehabilitation teaching robot using magneto-rheological fluid clutches", *JSME Int J* Series B 48(3):501-7, 2006.

[4] A. R. Johnson, W. A Bullough, J. Makin, "Dynamic simulation and performance of an electro-rheological clutch based reciprocating mechanism", *Smart Materials and Structures*, v 8, n 5, October, 1999, p 591-600.

[5] Perco laboratory website, as of 03/2008:
www.percro.org/index.php?pageId=MRClutch
www.percro.org/
index.php?pageId=AdvancedActuationConcepts

[6] M. Lauria, M.-A. Legault, P. Giguère, F. Gagnon, F. Michaud, M. Lavoie, *High Performance Differential Actuator for Robotic interaction tasks*, U.S. patent application 20070241696, 2007.

[7] B.-S. Kim, J.-J. Park, J.-B. Song, "Double actuator unit with planetary gear train for a safe manipulator", *Proceedings—IEEE International Conference on Robotics and Automation*, 2007, p 1146-1151.

[8] D. Chapuis, X. Michel, R. Gassert, C.-M. Chew, E. Burdet, H. Bleuler, "A haptic knob with a hybrid ultrasonic motor and powder clutch actuator", *Proceedings—Second Joint EuroHaptics Conference and Symposium on Haptic Interfaces for Virtual Environment and Teleoperator Systems, World Haptics* 2007, p 200-205.

[9] http://www.harmonicdrive.net

[10] http://www.lord.com/mr

What is claimed is:

1. A mechanical differential actuator for interacting with a mechanical load, comprising:
   a first semi-active sub-actuator;
   a second semi-active sub-actuator;
   a velocity source;
   a first mechanical differential having three interaction ports, including a first interaction port coupled to the velocity source, a second interaction port and a third interaction port coupled to the first semi-active sub-actuator; and
   a second mechanical differential having three interaction ports, including a first interaction port coupled to the velocity source, a second interaction port and a third interaction port coupled to the second semi-active sub-actuator;
   wherein the second interaction port of the first mechanical differential and the second interaction port of the second mechanical differential are coupled together to form an output which is configured so as to be coupled to the load.

2. The mechanical differential actuator as recited in claim 1 wherein the velocity source is selected from a group consisting of a powered geared electromagnetic motor, a direct-drive electromagnetic motor, a piezoelectric motor, a hydraulic motor, a hydraulic actuator, a pneumatic motor, a pneumatic actuator, a combustion engine and a turbine.

3. The mechanical differential actuator as recited in claim 1, wherein the first and second semi-active sub-actuator are identical.

4. The mechanical differential actuator as recited in claim 1, wherein the first and second semi-active sub-actuator are selected from a group consisting of a electrorheologic fluid brake, a magnetorheological fluid brake, a dry friction brake, a magnetic particles brake, a hysteresis brake and a hydraulic rotary brake.

5. The mechanical differential actuator as recited in claim 4, wherein the first and second semi-active sub-actuator are magnetorheological fluid brakes.

6. The mechanical differential actuator as recited in claim 5, further comprising a controller for controlling the velocity source and the first and second semi-active sub-actuators by modulating the electrical energy supplied to the magnetorheological fluid brakes.

7. The mechanical differential actuator as recited in claim 6, further comprising a motion sensor for sensing the motion of the output and provide motion information to the controller.

8. The mechanical differential actuator as recited in claim 7, wherein the controller uses a control scheme selected from a group consisting of an electrical tension feed-forward torque control scheme and an electrical current feed-forward torque control scheme.

9. The mechanical differential actuator as recited in claim 6, further comprising a sensor selected from a group consisting of a force sensor and a torque sensor for sensing the force or the torque applied to the load and provide force or torque information to the controller.

10. The mechanical differential actuator as recited in claim 9, wherein the controller uses a torque feedback control scheme.

11. The mechanical differential actuator as recited in claim 1, wherein the first interaction port of the first mechanical differential is coupled to the velocity source so as to move in a first direction and the first interaction port of the second mechanical differential is coupled to the velocity source so as to move in a second direction opposite the first direction.

12. The mechanical differential actuator as recited in claim 11, wherein the ports of the first and second mechanical differentials have corresponding functions.

13. The mechanical differential actuator as recited in claim 1, wherein the first interaction port of the first differential actuator is further coupled to the first interaction port of the second differential actuator so as to move in a common direction.

14. The mechanical differential actuator as recited in claim 13, wherein the first ports of the first and second mechanical differentials have corresponding functions and the second and third ports of the first and second mechanical differentials have alternate functions.

15. The mechanical differential actuator as recited in claim 13, wherein the second interaction port of the first mechanical differential and the second interaction port of the second mechanical differential are coupled together through an external mechanism so that the braking torques of the first and second semi-active sub-actuators produce output torques which are opposed in direction.

16. The mechanical differential actuator as recited in claim 1, wherein the first and second mechanical differentials include respective first and second speed reducer mechanisms for implementing a mechanical differential function, the velocity source being coupled to the first and second speed reducer mechanisms.

17. The mechanical differential actuator as recited in claim 16, wherein the first and second speed reducer mechanisms are selected from a group consisting of a cable mechanism, a lead or ball screw with corresponding nut mechanism, a bar mechanism, a cycloidal gearbox, an epicyclic gearbox, a standard gearbox and a harmonic drive.

18. The mechanical differential actuator as recited in claim 1, wherein the first and second mechanical differentials include respective first and second harmonic gearing stages;
   the first harmonic gearing stage comprising a wave generator connected to the first port of the first mechanical differential, a circular spline connected to the second port of the first mechanical differential and a flexible spline connected to the third port of the first mechanical differential;

the second harmonic gearing stage comprising a wave generator connected to the first port of the second mechanical differential, a circular spline connected to the second port of the second mechanical differential and a flexible spline connected to the third port of the second mechanical differential.

19. The mechanical differential actuator as recited in claim 18, wherein the first harmonic gearing stage further comprises a dynamic spline connected to the third port of the first mechanical differential and the second harmonic gearing stage further comprises a dynamic spline connected to the third port of the second mechanical differential.

20. The mechanical differential actuator as recited in claim 1, wherein the first and second mechanical differentials include respective first and second epicyclic gearing stages;

the first epicyclic gearing stage comprising a sun gear connected to the first port of the first mechanical differential, at least one planet gear connected to the second port of the first mechanical differential and an annulus gear connected to the third port of the first mechanical differential;

the second epicyclic gearing stage comprising a sun gear connected to the first port of the second mechanical differential, at least one planet gear connected to the second port of the second mechanical differential and an annulus gear connected to the third port of the second mechanical differential.

* * * * *